United States Patent [19]

Rioux

[11] Patent Number: 4,645,347
[45] Date of Patent: Feb. 24, 1987

[54] THREE DIMENSIONAL IMAGING DEVICE

[75] Inventor: Marc Rioux, Ottawa, Canada

[73] Assignee: Canadian Patents and Development Limited-Societe Canadienne des Brevets et d'Exploitation Limitee, Ottawa, Canada

[21] Appl. No.: 729,137

[22] Filed: Apr. 30, 1985

[51] Int. Cl.$^4$ ............................................. G01B 11/24
[52] U.S. Cl. ..................................... 356/376; 250/201
[58] Field of Search ................. 250/201 AF; 356/375, 356/376

[56] References Cited

U.S. PATENT DOCUMENTS

| | | | |
|---|---|---|---|
| 3,589,815 | 6/1971 | Hosterman | 356/376 X |
| 3,912,922 | 10/1975 | Lacotte et al. | 250/201 AF X |
| 4,009,386 | 2/1977 | Deml et al. | 250/201 AF |
| 4,074,104 | 2/1978 | Fulkerson | 219/121 LM |
| 4,176,160 | 10/1979 | Ernst | 356/375 |
| 4,329,060 | 5/1982 | Wilder | 356/375 |
| 4,548,504 | 10/1985 | Morander | 356/375 |

OTHER PUBLICATIONS

3-D Inspection Using Multi-Stripe Structured Light, Case et al., Cyber Optics Co., Mar. 1985.

Primary Examiner—Eugene R. LaRoche
Assistant Examiner—James C. Lee

[57] ABSTRACT

An imaging device employs a known bidimensional, position sensitive light detector of the CCD type. A converging lens system images points on a target surface onto the detector to generate data on the X and Y coordinates of each point. The invention is characterized by a mask located in the aperture plane of the lens system. This mask either has a pair of spaced apart, separate, circular apertures or an annular aperture symmetrical about the optical axis. In the first instance, the result is to form spaced-apart dots on the detector for each point of the target surface, the distance between these dots being a measure of the Z coordinate of the respective point. When using the annular aperture, rings are formed on the detector, the ring diameter representing the Z data. The arrangement provides a compact and robust device for obtaining three dimensional data on a target surface.

15 Claims, 5 Drawing Figures

THREE DIMENSIONAL IMAGING DEVICE

BACKGROUND OF THE INVENTION

The present invention relates to a three dimensional imaging device, that is to say a device for obtaining three dimensional data of a target surface, whether such data is displayed in three dimensional form or not. Indeed, the data may never be displayed as such, but may merely be used to control other equipment. Such an imaging device is useful for supplying three dimensional data to other instruments. For example, such data is valuable in the science of robotics, where objects are required to be identified on the basis of their three dimensional shape, and to be manipulated accordingly. Such data is also useful in monitoring the accuracy of the shape of a series of articles intended to be identical with each other.

An objective of the present invention is to provide a three dimensional imaging device that is inexpensive to manufacture, high speed in operation, compact, and robust, and hence especially well adapted for use in robotics, e.g. for mounting on the end of a robot arm, although the utility of the present invention is by no means limited to robotics. An ordinary two dimensional television camera provides an output signal having an amplitude that is not geometrically related to the object but represents the surface reflectance properties of the object, combined with the ambient light conditions, the orientation of the object and the intensity and spectral characteristics of the ambient light. The result thus will often depend on the orientation of the object and the proximity of other objects. Primary for these reasons, the extraction of three dimensional features from a two dimensional image is often difficult to realize.

Among the various techniques suggested in the past for obtaining three dimensional data is the use of an active triangulation system employing a beam of radiation, e.g. laser light, that is projected onto an area of the target surface to be examined, combined with a position sensitive detector for measuring deviations in the reflective beam. Such a system is disclosed in my U.S. patent application Ser. No. 509,373 filed June 30, 1983 (Canadian Ser. No. 455,847 filed June 5, 1984) entitled Three Dimensional Imaging Method and Device, and in the prior documents referred to in such application.

The system described in my said prior application requires synchronously scanning of the target area under examination by a light source and a uni-dimensional position sensitive light detector. The detector detects the beam reflected by the surface area. The scanning position indicates the X and Y coordinates in a reference plane of each area, while the position in the detector at which the beam is received represents a measure of the deviation of the target area in the direction perpendicular to the reference plane, i.e. the Z coordinate. This technique has many practical uses, but requires maintenance of the object in a fixed position or under controlled motion.

SUMMARY OF THE INVENTION

The present invention provides an imaging device that can obtain the three dimensional data of a moving target surface. Moreover, it is not necessary in the present invention to move the imaging device to achieve a scanning effect. Also, in those instances where the target surface is illuminated by a light source either to increase the preciseness of the measurement, or in order to use a particular wavelength of light, or to use structured light, it is unnecessary to scan such light source.

To this end, the invention provides an imaging device comprising a converging lens system defining an optical axis and a position sensitive detector extending in at least one direction X perpendicular to such axis, and preferably in two mutually perpendicular directions X and Y, e.g. a bidimensional CCD (charge coupled device) of the type commonly employed in television cameras. The lens system serves to image points on a target surface onto the detector to generate data on the coordinates of such points in the X or X and Y directions.

The invention is characterised by the provision of a mask preferably located substantially in or near to the aperture plane of the lens system. This mask is opaque, except for at least two aperture portions. These aperture portions may comprise a pair of spaced-apart, separate apertures, each preferably circular in shape, or may be portions of an annular aperture. The effect of these apertures or aperture portions in the mask is to form on the detector discrete images of each point of the target surface. When separate apertures are used, these discrete images are spaced-apart dots. When the annular aperture is used, each discrete image is a ring and such rings may be spaced apart or overlapping. At least their centres will be spaced apart. For each point on the target surface, this spacing between dots or rings or other discrete images represents the coordinate of such point in the Z direction, i.e. the direction perpendicular to both the X and Y directions.

Ideally, the mask will be exactly in the aperture plane of the lens system, but, in practice, some tolerance is permissable in this regard. In particular, when using a wide angle lens system, the location of the mask is relatively critical, because severe vignetting would be experienced if there were much displacement of the mask from the aperture plane. However, for normal or telephoto lens systems, the location of the mask is a good deal less critical and the mask could even be located in front of the lens system, i.e. on the side towards the target surface. With the mask so located, some vignetting would be experienced, but not to an extent detrimental to the measurement.

BRIEF DESCRIPTION OF THE DRAWINGS

Embodiments of the invention are illustrated by way of example in the accompanying drawings, in which.

DESCRIPTION OF THE PREFERRED EMBODIMENTS

Figure 1:
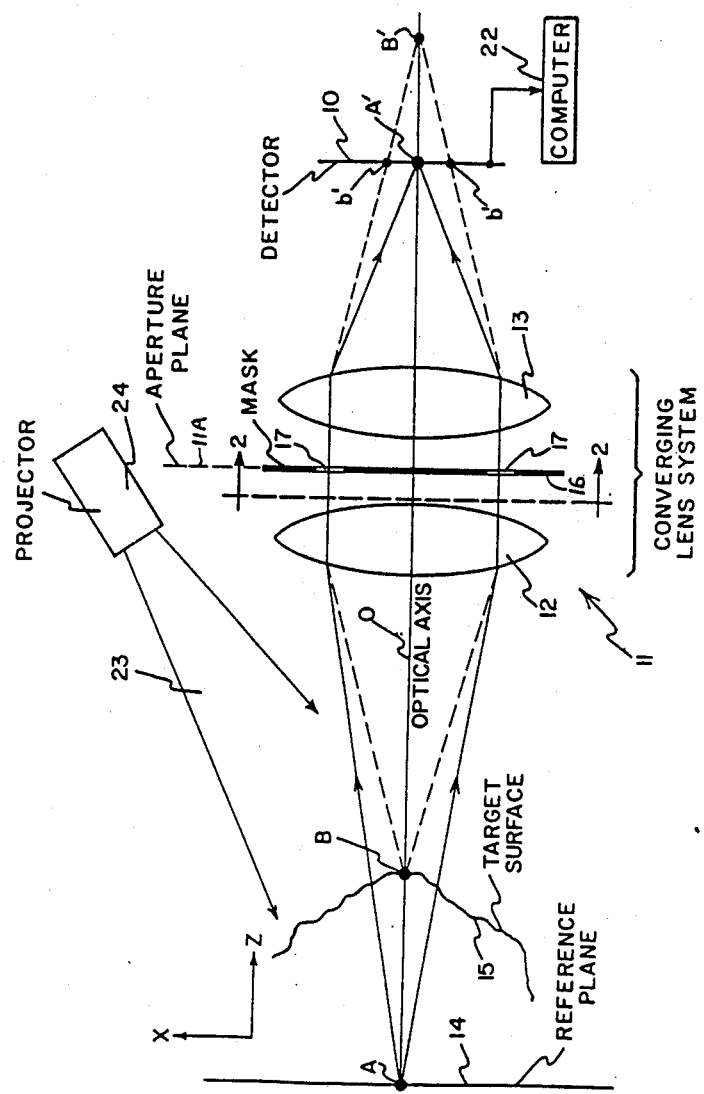
FIG. 1 shows the basic elements of an imaging device according to a first embodiment of the invention.

FIG. 1 shows a bidimensional CCD detector 10 of the type commonly employed in television cameras. A converging lens system 11 is assumed to consist of two lenses 12 and 13. In reality, especially since a wide angle lens will normally be preferred, each of the lenses 12 and 13 will itself consist of a group of lenses. Reference numeral 14 designates a reference plane and 15 is an object under study, i.e. the target surface. The converging lens system 11 will focus a point A at the intersection of the reference plane 14 and the optical axis 0 at a point A' on the detector 10. However, a point B on the surface of the object 15 and also on the axis 0 while having a positive Z coordinate, will theoretically be focussed at a point B' beyond the detector 10. In practice, the image of the point B will appear as a large, unfocussed, circular area on the detector 10 between points b'.

However, in accordance with the present invention, a mask 16 is associated with the lens system and is preferably located in, or as near as practicable to, the aperture plane 11A of the lens system, i.e. the plane in which vignetting is a minimum. In practice, a typical camera lens system with a normal adjustable aperture will be used, in which case the mask will preferably be located in close proximity to this aperture.

Figures 2, 2A:
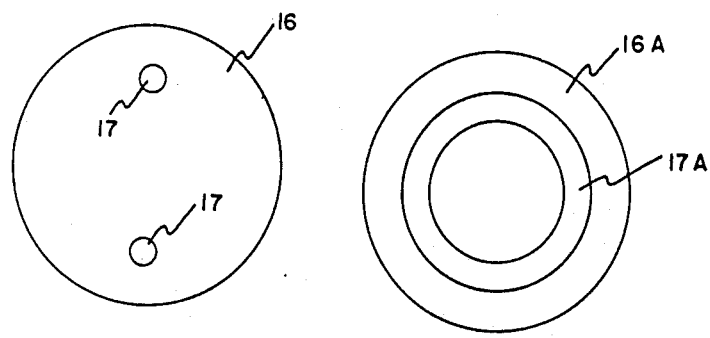
FIG. 2 is a section on the line 2—2 in FIG. 1.
FIG. 2A is a modification of FIG. 2.

This mask 16, as seen in FIG. 2, has a pair of circular apertures 17 through which light can pass. The remainder of the mask is opaque. The effect of the use of the mask 16 is to cause the detector 10 to receive at the points b' two small discrete dots or images of the point B.

The distance between these two illuminated dots b' is a function of the distance Z of the point B from the reference plane 14. The detector 10 thus has the needed information of the Z coordinate of each point within its field of view in the X and Y directions. In a computer 22, to which the detector 10 is connected, the spacing between the points b' is measured to represent the Z coordinate for each point B, while the center point between the points b', as calculated by the computer, represents the X and Y coordinates for the point B. This data will be extracted in the usual way by electrically scanning the pixels of the detector 10. More specifically, the scan lines of the detector 10 will be oriented parallel to the mask aperture axis, i.e. the line between the two apertures 17. The horizontal scanning of the detector will produce a signal that will be digitally processed line by line. The position of the geometrical center (X and Y coordinates) and the distance between the two points b' (Z coordinate) can then readily be extracted in real time. To this end the video signal can first be filtered and differentiated at video rate (6 MHz) using a finite impulse response filter. See, for example, U.S. patent application of F. Blais Ser. No. 729,138 filed concurrently herewith. In the method disclosed in this Blais application, the zero crossing of the first derivative (after linear interpolation) provides the position of the peak to a fraction of a pixel.

Other ways of processing this data are known and disclosed in U.S. Pat. Nos. 3,178,595 issued Apr. 13, 1965 to R. H. Cole and 3,891,930 issued June 24, 1975 to E. O. V. Petrusson.

Figure 3:
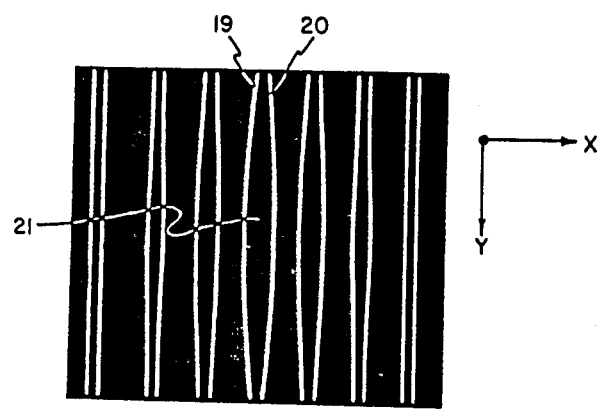
FIG. 3 is a representation of a view of an object as seen by the device.

While this imaging device can function with ambient light, provided the target surface has sufficient texture, in most circumstances it is preferred to illuminate the object 15 with structured light 23 from a projector 24. For example, the processing of the data is facilitated if the projector 24 illuminates the object with a multi-stripe pattern. In this case, a typical image produced in the detector 10 will be as in FIG. 3, which shows a typical pair of stripes 19 and 20 of the light pattern extending in the Y direction while bulging outwardly at the middle, i.e. in the X direction. Such a bulge 21 represents an increase in the spacing between the two points b' and hence a larger value for Z. FIG. 3 thus represents a target surface that is generally domed towards the imaging device.

When only ambient light is used, the extraction of the shift, i.e. the spacing between the two points b', can be accomplished by known cross-correlation or autocorrelation techniques, e.g. the Correlation and Probability Analyzer manufactured by Honeywell, Test Instruments Division of Denver Colorado.

If the projector 24 comprises a pulsed laser, the device is capable of freezing a relatively fast moving object for study.

FIG. 2A shows an alternative mask 16A in which the discrete apertures 17 are replaced by an annular aperture 17A, i.e. an aperture having a number of aperture portions distributed around its periphery. When using this alternative mask the image generated by the point B on the detector 10 will be a ring passing through the points b'. The diameter of this ring will represent the Z coordinate. When using this annular aperture, the multi-striped structured light referred to above would be inappropriate. For this alternative aperture the preferred form of structured light is a pattern of dots. Such a pattern of dots can also be used with the mask 16 of FIG. 2.

While the double aperture mask 16 of FIG. 2 has the merit of simplicity, the annular aperture mask 16A of FIG. 2A is more accurate. At a range of 1 m, it has been found that an accuracy of ±0.1 mm in the Z value can be obtained using the annular aperture, whereas with the double aperture an accuracy more of the order of ±1 mm is to be expected.

With the arrangement of FIG. 1, if the Z coordinate of the point B is negative, the detector 10 will still see a pair of separated points b', but there will be no indication whether the Z coordinate is positive or negative. This difficulty can be overcome by applying a bias in the manner shown in FIG. 4. In this embodiment of the invention, there is attached to the mask 16 a biprism lens 19, i.e. a double wedge lens, which causes the image from the point A on the reference plane 14 (solid lines) to appear at points a'. When the point B has a positive Z value, as in FIG. 1, the images appear at b'. When it has a negative value, they appear at b''. The Z data is still inherent in the spacing between the dots, but the sign is known. If this embodiment of the invention employs the mask 16A having the annular aperture 17A, then the lens 19, instead of being a biprism lens, will be an axicon lens, i.e. a conical lens.

A further advantage of using this bias is an increase of the depth of view, i.e. keeping the image in focus for a larger range of Z.

Figure 4:
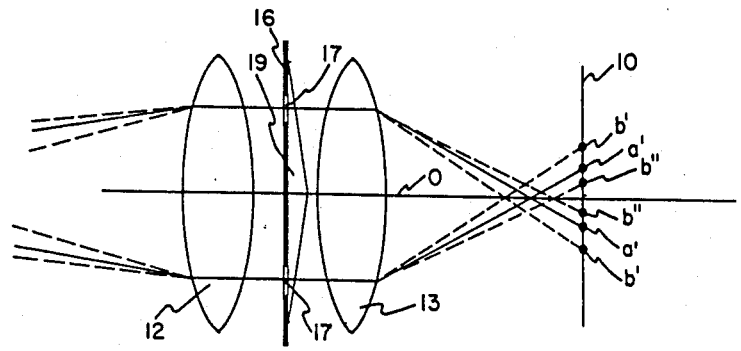
FIG. 4 is a fragmentary view of a second embodiment.

The remainer of the device of FIG. 4 will be the same as in FIG. 1.

While the detector 10 has been described as bi-dimensional, i.e. extending in the X and Y directions, the invention includes a device in which a uni-dimensional position sensitive detector is used. Such a unidimensional detector would extend in the X direction shown in FIG. 1, this direction being effectively defined as a direction perpendicular to the optical axis 0 and parallel to the line between the apertures 17 of the mask 16. The mask 16A having the annular aperture 17A would not be usable with such a uni-dimensional system.

In a uni-dimensional system, scanning in the Y direction can be achieved either by controlled motion of the target object or by indexing of the optical axis, this latter technique probably being best accomplished by interposing a mirror in the optical system and mounting such mirror for rotation by a stepping motor about an axis extending in the X direction.

I claim:

1. In an imageing device having a converging lens system defining an optical axis and a position sensitive light detector having a series of pixels extending in at least one direction X perpendicular to said axis, said lens system serving to simultaneously image a plurality of distributed points on a target surface onto the detector to generate first data on the coordinate of each said point in said X direction; a mask having at least two apertures spaced apart from each other in said X direction for forming on the detector discreted images of each said point to generate, by means of the spacing between said images, second data on the coordinate of each said point in the direction Z of said optical axis; and means for scanning said pixels to extract said first and second data for all said points.

2. The device of claim 1, wherein the mask is located substantially in the aperture plane of the lens system.

3. The device of claim 1, wherein the mask is located on the side of the lens system nearer the target surface.

4. The device of claim 1, wherein said apertures are symmetrically located on opposite sides of the optical axis and are each circular in shape.

5. The device of claim 1, including means for illuminating the target surface with a structured pattern of light.

6. The device of claim 1, including a biprism lens located adjacent the mask for providing said discrete images with a bias relative to a reference plane whereby to indicate the sign of each said Z coordinate relative to said plane.

7. In an imaging device having a converging lens system defining an optical axis and a bidimensional position sensitive light detector having an array of pixels extending in mutually perpendicular directions X and Y, said lens system serving to simultaneously image a plurality of distributed points on a target surface onto the detector to generate first data on the coordinates of each said point in said X and Y directions; a mask having at least two aperture portions for forming on the detector discrete images of each said point to generate, by means of the spacing between said images, second data on the coordinate of each said point in the direction Z of said optical axis perpendicular to both the X and Y directions; and means for scanning said pixels to extract said first and second data for all said points.

8. The device of claim 7, wherein the mask is located substantially in the aperture plane of the lens system.

9. The device of claim 7, wherein the mask is located on the side of the lens system nearer the target surface.

10. The device of claim 7, wherein said aperture portions comprise a pair of separate, circular apertures symmetrically located on opposite sides of the optical axis.

11. The device of claim 10, including means for illuminating the target surface with a structured pattern of light.

12. The device of claim 10, including a biprism lens located adjacent the mask for providing said discrete images with a bias relative to a reference plane whereby to indicate the sign of each said Z coordinate relative to said plane.

13. The device of claim 7, wherein said aperture portions are portions of an annular aperture described about the optical axis.

14. The device of claim 13, including means for illuminating the target surface with a structured pattern of light.

15. The device of claim 13, including an axicon lens located adjacent the mask for providing said discrete images with a bias relative to a reference plane whereby to indicate the sign of each said Z coordinate relative to said reference plane.

* * * * *